Patented May 12, 1953

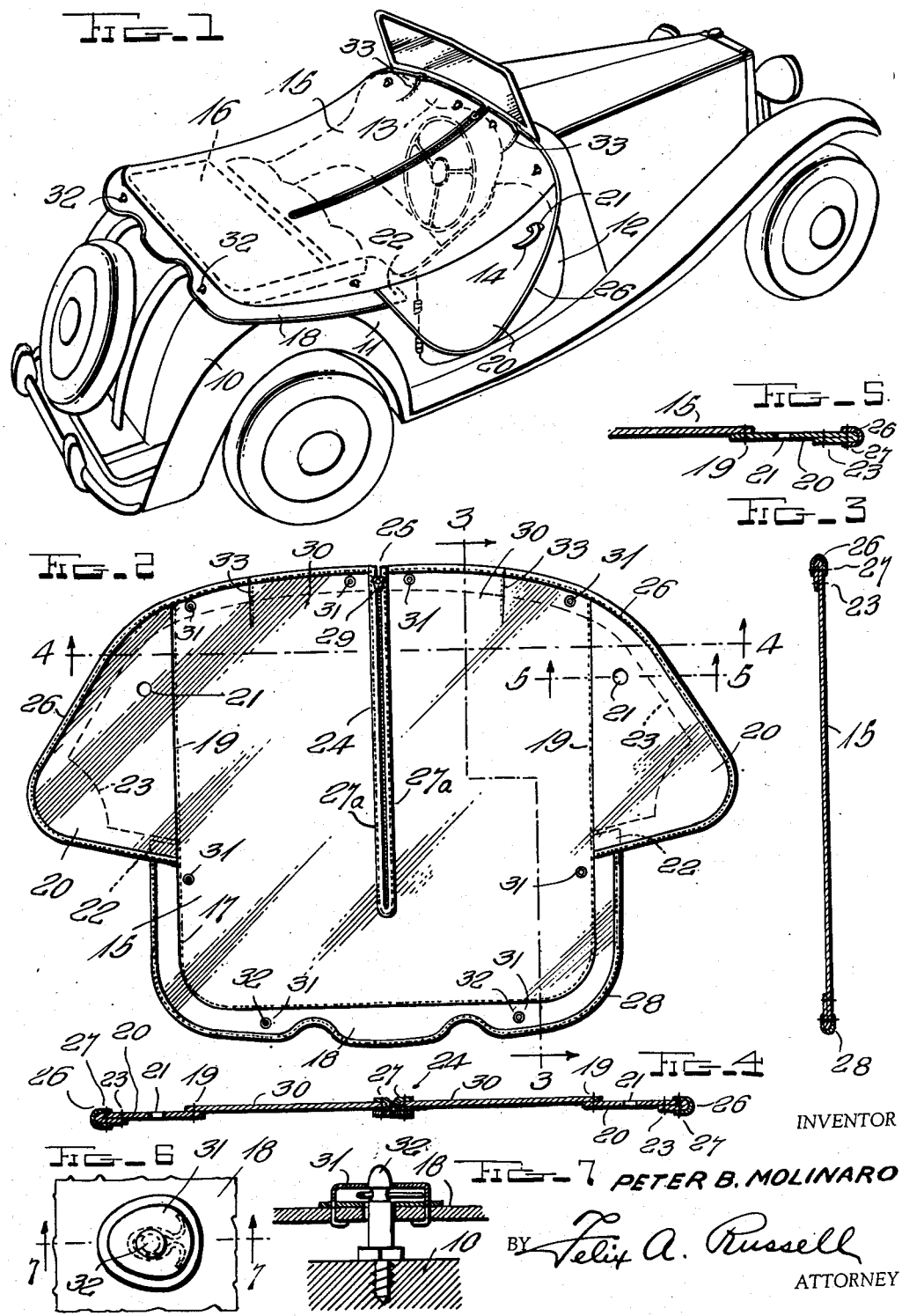

2,638,378

UNITED STATES PATENT OFFICE 2,638,378

TONNEAU COVER FOR MOTOR VEHICLES

Peter B. Molinaro, Verona, N. J.

Application January 2, 1952, Serial No. 264,576

3 Claims. (Cl. 296—136)

The present invention relates to a tonneau cover for motor vehicles and it consists in the combinations, constructions and arrangements of parts herein described and claimed.

Generally there is provided a tonneau cover which is adapted to cover that portion of an unenclosed automobile known as the "tonneau." The device is composed of a dust-proof and waterproof material which is shaped to conform with the shape of the upper portions of the side walls, rear wall, doors and the top or roof over the dashboard or instrument panel of such automobile. The device is further provided with downwardly extending flanged portions provided with snap fastening devices engageable with outwardly projecting pins carried by the automobile itself. A flap is formed integrally or by sewing at either side of the device and is adapted to cover the greater portion of the door customarily found at either side of the automobile to be covered thereby and each flap is provided with a circular opening for the reception therethrough of the conventional door-operating handle. The cover is bifurcated from a point centrally located in the forward edge thereof longitudinally to a point adjacent the rear edge thereof and such bifurcated portions are interconnected by means of a zipper or other slide fastener. The device is such that it will fully and completely protect the interior of the tonneau from dust, snow and rain and at the same time protect the folded top customarily associated with so-called "open" cars. The device is easily assembled and disassembled and is capable of being packed in a minimum of space when not in use. The device possesses several important improvements which will be brought out in the appended specification.

It is accordingly an object of the invention to provide a device of the character set forth which is simple in construction, inexpensive to manufacture and yet effective and efficient in use.

Another object of the invention is to provide a device of the character set forth having means whereby the same may be quickly and easily attached to or detached from a conventional "open" motor car.

Another object is to provide, in a device of the character set forth, a novel zipper arrangement forming a part of the invention.

A further object of the invention is the provision, in a device of the character set forth, of a novel flap arrangement forming a part of the invention.

Other and further objects of the invention will become apparent from a reading of the following specification taken in conjunction with the drawing, in which:

Figure 1 is a perspective view of an embodiment of the invention shown mounted upon a motor car, Figure 2 is a plan view of the tonneau cover forming the present invention, Figure 3 is a sectional view taken substantially along line 3—3 of Figure 2, Figure 4 is a sectional view taken along line 4—4 of Figure 2, Figure 5 is a fragmentary sectional view, somewhat enlarged, taken substantially along line 5—5 of Figure 2, Figure 6 is an enlarged elevational view of a fastening device forming a part of the invention, and Figure 7 is a fragmentary sectional view taken along line 7—7 of Figure 6.

Referring more particularly to the drawing, there is shown therein a motor car of the "open" type, that is to say not having a permanent cover for the passenger compartment thereof, but having a rear wall 10, side walls 11, doors 12 mounted one in each side and a permanent roof or top for the dashboard and instrument panel, as indicated at 13. The doors 12 are each provided with an operating handle 14.

The device comprising the present invention consists of a main cover portion 15 which is adapted to cover the opening between the side walls and the roof 13 and that portion generally designated at 16 wherein the conventional folding top for such open car is adapted to lie when not in use. Affixed as by stitching 17, to the entire rear edge of the portion 15 and to the rearward portions of each side thereof is a dependent flap 18. Affixed to the forward portion of each side of the main body 15 by stitching 19 or the like is an enlarged door flap 20 each of which is provided adjacent its forward end with a circular opening 21 for the reception therethrough, in each case, of one of the handles 14 when the device is in use. It will be seen that the rearward edges of each of the door flaps 20 overlaps the forward portions of the flap 18, as indicated at 22.

The outer edge portions of the door flaps 20 are folded under and stitched, as indicated at 23, to afford additional strength in such areas. The main cover portion 15 is centrally divided, as generally indicated at 24 which divisional slit is indicated at 25 and extends from a central point in the forward edge of the main body 15 to a point adjacent the rear edge thereof.

Edging material 26 is stitched, as indicated at 27, to the peripheral edges of the flaps 20 and the forward edges of the body 15 and continue, as indicated at 27a, along the inner edges of the slit 25. Like edging material 28 is affixed to the outer edge of the flap 18.

The slit 25 is adapted to be opened and closed by means of a zipper 29 or like slide fastener means. It will be seen that the forward portion of the body 15 is divided by the slit 25 into two furcations 30 and that adjacent the forward edge of each of the furcations and adjacent each corner thereof there is provided a female snap fastener 31. A pair of snap fasteners 31 is also provided in spaced relation to the outer ends thereof in the flap 18 and that the cover 15 is likewise provided adjacent the rearward edge of each of the door flaps 20 with female snap fasteners 31. One of such female snap fasteners 31 is shown in detail in Figures 6 and 7 of the drawing. Affixed to the walls 10 and 11 and to the member 13 is a plurality of pins 32 each of which is mounted at a point convenient for its insertion through one of the female snap fastener members 31, such pins forming, in effect, the male portion of such snap fastener members.

If desired and particularly for use in such cars where the forward portion of the tonneau is of less width than the rear portion thereof, a tuck 33 may be formed centrally in each of the furcations 30 at the forward edge portion thereof.

In operation, it will be apparent that when it is desired to enclose the tonneau of the automobile, it is only necessary to unfold the device forming the present invention and release the edge portions of the slit from each other by manipulating the slide fastener 29. Thereupon the various male fastener members 32 may be inserted in their proper female fastener members 31 whereupon the slide fastener device 29 may be manipulated to close the edges of the slit 25 together to thus form a completely tight closure which is waterproof and dust-proof and which will fully enclose the passenger compartment and the portion 16 above referred to. It will be noted that the door flaps 20 overlap the forward portions of the dependent flap 18 thus insuring against any moisture in the form of rain or snow from entering into the passenger compartment. The openings for the handles 21 provide a convenient means whereby the door flaps 20 may lie closely adjacent the doors 12 to protect the same.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination with an automobile having a body having a rear wall, side walls, a door in each of said side walls, a handle for each of said doors, and an instrument panel roof; said walls, doors, and roof defining an open tonneau, the provision of a cover of flexible waterproof material, a dependent flap of flexible waterproof material affixed to the edge of said cover and extending along the rear edge of the rear portions of the side edges thereof, and a pair of door flaps likewise formed of flexible waterproof material each affixed to the forward portion of a side edge of said cover, said door flaps each provided with an opening for receiving therethrough one of said handles.

2. A device of the character described comprising, in combination with an automobile having a body having a rear wall, side walls, a door in each of said side walls, a handle for each of said doors, and an instrument panel roof; said walls, doors, and roof defining an open tonneau, the provision of a cover of flexible waterproof material, a dependent flap of flexible waterproof material affixed to the edge of said cover and extending along the rear edge and the rear portions of the side edges thereof, a pair of door flaps likewise formed of flexible waterproof material each affixed to the forward portion of a side edge of said cover, said door flaps each provided with an opening for receiving therethrough one of said handles, said cover being longitudinally split from the center of its forward edge to a point spaced from its rearward edge, and a slide fastener for closing the edges of said split portion.

3. A device of the character described comprising, in combination with an automobile having a body having a rear wall, side walls, a door in each of said side walls, a handle for each of said doors, and an instrument panel roof; said walls, doors, and roof defining an open tonneau, the provision of a cover of flexible waterproof material, a dependent flap of flexible waterproof material affixed to the edge of said cover and extending along the rear edge and the rear portions of the side edges thereof, a pair of door flaps likewise formed of flexible waterproof material each affixed to the forward portion of a side edge of said cover, said door flaps each provided with an opening for receiving therethrough one of said handles, said cover being longitudinally split from the center of its forward edge to a point spaced from its rearward edge, and a slide fastener for closing the edges of said split portion, and snap fastener means for removably attaching said cover to said body.

PETER B. MOLINARO.

References Cited in the file of this patent

UNITED STATES PATENTS

| Number | Name | Date |
|---|---|---|
| 1,186,883 | Clark | June 13, 1916 |

FOREIGN PATENTS

| Number | Country | Date |
|---|---|---|
| 278,964 | Great Britain | Oct. 20, 1927 |